(12) United States Patent
Kelly et al.

(10) Patent No.: US 7,231,888 B1
(45) Date of Patent: Jun. 19, 2007

(54) DISPOSABLE ABSORBENT PET TRANSPORT CUSHION

(75) Inventors: Lisa Kimberly Kelly, Portland, OR (US); Burton Oscar Christiansen, Portland, OR (US)

(73) Assignee: K C Pet Products, LLC, Portland, OR (US)

( * ) Notice: Subject to any disclaimer, the term of this patent is extended or adjusted under 35 U.S.C. 154(b) by 57 days.

(21) Appl. No.: 11/022,480

(22) Filed: Dec. 22, 2004

Related U.S. Application Data

(60) Provisional application No. 60/553,799, filed on Mar. 17, 2004.

(51) Int. Cl.
*A01K 29/00* (2006.01)

(52) U.S. Cl. .................. 119/28.5; 119/161

(58) Field of Classification Search ............... 119/28.5, 119/169, 170, 420, 161; 5/484, 487, 420; 128/849, 845
See application file for complete search history.

(56) References Cited

U.S. PATENT DOCUMENTS

| | | | | |
|---|---|---|---|---|
| 4,410,578 A | * | 10/1983 | Miller | 428/117 |
| 4,532,890 A | * | 8/1985 | Ohki et al. | 119/172 |
| 4,640,225 A | | 2/1987 | Yananton | |
| 4,800,677 A | | 1/1989 | Mack | |
| 4,852,518 A | | 8/1989 | Yananton | |
| 5,031,578 A | * | 7/1991 | Hammons et al. | 119/167 |
| 5,250,310 A | * | 10/1993 | Fujino et al. | 426/124 |
| 5,579,722 A | | 12/1996 | Yamamoto et al. | |
| 5,630,376 A | | 5/1997 | Ochi et al. | |
| 5,685,257 A | | 11/1997 | Feibus | |
| 5,743,213 A | * | 4/1998 | Fujiura | 119/172 |
| 5,797,347 A | | 8/1998 | Ochi | |
| 6,021,740 A | | 2/2000 | Martz | |
| 6,227,145 B1 | | 5/2001 | Miyamoto et al. | |
| 6,244,216 B1 | | 6/2001 | Ochi | |
| 6,662,749 B1 | * | 12/2003 | Wiedenhaft et al. | 119/172 |
| 6,684,816 B2 | | 2/2004 | Lippincott | |
| 7,013,496 B2 | * | 3/2006 | Dunn | 2/458 |
| 2002/0000206 A1 | | 1/2002 | Ikegami | |
| 2003/0130643 A1 | * | 7/2003 | Drevik et al. | 604/385.31 |

FOREIGN PATENT DOCUMENTS

| | | |
|---|---|---|
| GB | 2 323811 A1 | 7/1998 |
| JP | 08038893 A  * | 2/1996 |

OTHER PUBLICATIONS

Gayle Martz, Inc., Sherpa Liners product webpage, www.sherpapet.net/products/detail, etc. Dec. 17, 2004 at 4:36 pm, copy attached.

(Continued)

*Primary Examiner*—Kimberly S. Smith
(74) *Attorney, Agent, or Firm*—Paul Eberhardt

(57) ABSTRACT

A disposable absorbent cushion for use in pet carriers, crates, cages or other containers. The cushion features a liquid permeable outer layer and a super-absorbent inner layer, to keep the animal dry, even if it urinates. The cushion includes a rigid element which is cushioned and insulating. This rigid element, in the interior region of the cushion, keeps the cushion from bunching up, and provides a comfortable place for the animal to sit. The cushion also has a flexible peripheral region, which allows the cushion to be used in a variety of carriers with similar, but not identical, dimensions, and provides a comfortable nest-like effect.

3 Claims, 2 Drawing Sheets

OTHER PUBLICATIONS

Gayle Martz, Inc., Travel Tray product webpage, www.sherpapet.net/products/detail, etc. Dec. 17, 2004 at 1:44 pm, copy attached.

No Author Listed, Clean Go Puppy Pads product webpage, www.petedge.com/sdx/139608.jsp Dec. 16, 2004, copy attached.

Drs. Foster & Smith, Inc., Cozy Cushion product webpage (2 pages), www.drsfostersmith.com/product, etc., Dec. 10, 2004, copy attached.

The Dog's Outfitter, Dura Padd product webpage www.dosgoutfitter.com/prodetail.asp?T1=020410+615&ctg=&tid=203, Dec. 10, 2004, copy attached.

* cited by examiner

DISPOSABLE ABSORBENT PET TRANSPORT CUSHION

CROSS REFERENCE TO RELATED APPLICATIONS

This application is entitled to the benefit of the filing date of U.S. Provisional Patent Application 60/553,799, by Lisa Kimberly Kelly & Burton Oscar Christiansen for a Disposable Absorbent Pet Transport Cushion, filed Mar. 17, 2004.

STATEMENT REGARDING FEDERALLY SPONSORED RESEARCH OR DEVELOPMENT

None.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE 37 CFR 1.52(E)(5).

Not applicable.

BACKGROUND OF THE INVENTION

1. Field of the Invention

This invention relates to cushions for use as disposable bedding in pet carriers, crates, cages or other containers in which pets are transported or housed (for example, in hotels, homes, kennels and the like). The purpose of the cushion is to absorb pet urine, and to provide a comfortable, dry, thermal insulating surface for the pet to rest on. The invention was developed principally with cats in mind, but is equally well adapted for use in transporting dogs and other animals, both pets and others, in cages.

2. Description of the Related Art Including Information Disclosed Under 37 CFR 1.97 and 1.98.

There are a wide variety of commercially available carriers and cages for use in transporting animals. One example is the Pet Taxi, sold by Petmate of Arlington, Tex. Typically, these carriers are designed to be light, durable, easy to carry and easy to clean. For this reason, they typically have bottoms that are hard, provide little or no insulation, and are generally uncomfortable for an animal to sit on. This is a particular problem when the carriers are used for air transport of the animals, because they may be placed on very cold surfaces for very long periods. Most such carriers also do not make any provision for animal urine, though this is a frequent problem, either because the animal urinates due to the stress of being transported, or because it is confined in the carrier for a very long period.

A common method for dealing with these problems has been to simply place an old towel in the bottom of the cage. This provided for some cushioning and insulation, as well as some absorption of urine, if necessary. One problem with using a towel is that because it is not rigid the towel tends to become bunched at the end or side of the cage rather than remaining evenly spread across its bottom. A related problem is that a towel tends to slide under the animal, preventing the animal from getting or keeping its footing. This has the potential to cause the animal discomfort or injury. If a towel becomes urine soaked, it is uncomfortable and irritating for the animal to sit on, and unless promptly cleaned causes unpleasant odors and a potential sanitary problem. Finally, once the animal is removed from the carrier, this arrangement usually requires both the carrier and the towel to be cleaned—an unpleasant and time consuming chore.

There have been some attempts to improve upon the towel, none of which have been satisfactory. One class of products consists of a block of open cell foam or sponge, typically approximately 1.27 cm to 5.08 cm (0.5 inches to 2.0 inches) thick, typically sized to fit into the bottom of a carrier and typically sold with a covering. Typically the top covering is water-permeable. The most important disadvantage of these products is that the open cell foam only absorbs urine so long as the animal is not sitting or standing on it. When pressure is applied, the liquid is expressed out of the sponge. Since in this situation the animal has nowhere to stand or sit except on the cushion, the product simply does not work. Another disadvantage is that the cushion must be sized to fit the carrier within reasonable tolerances—since carriers come in a wide variety of shapes and sizes, a wide variety of cushion sizes and shapes would be required to cover the market. Another disadvantage is that between each use the foam or sponge must be cleaned and/or disinfected—which is difficult at best.

A variation on the foam/sponge approach is the PoochPad Ultra-Dry Transport System for Crates and Kennels, described at www.poochpad.com. This product substitutes a multi-layer cloth pad for the open cell sponge—in principle it is a variation on the towel. Like the sponge-based products, it does not keep the animal dry, if it is urinated upon, because it retains little fluid if the animal stands or sits on it (as it must in a carrier). It is also messy to clean.

U.S. Pat. No. 5,517,772, to Kamreth et al for Pet Carrier Absorbent Pad is yet another attempt to solve this problem. Kamreth's patent involves a layer of "driweave" material, described as "specially designed layers that provide a one way barrier to moisture," placed over a layer of absorbent material, "such as felt, saw dust, or other desiccating material." The biggest problem with the Kamreth invention is that it does not work, at least not with presently available fabric technology, because it depends on using a one way barrier to moisture, and no such barrier is presently available. Kamreth refers to this one-way barrier as "driweave." DRI-WEAVE is a trademark of Procter & Gamble Co, and refers to the "topsheet component of catamenial products, namely sanitary napkins and pantiliners." This material is water permeable in both directions. Another problem with the Kamreth invention is that it consists of a flexible sheet, and is therefore liable to slide or bunch, just like an old fashioned towel. The Kamreth invention attempts to solve this problem by use of adhesive strips, which is messy and unreliable.

A similar problem in a slightly different field is addressed by U.S. Pat. No. 4,800,677, to Mack for Animal Waste Collection Pad. The Mack invention, which is not meant to be used in a cage or carrier, consists of a permeable layer over an absorbent layer, over an impermeable layer. The liquid part of the animal waste passes through the permeable layer, is absorbed in the absorbent layer, and is prevented from spilling or leaking further by the bottom impermeable layer. After the animal eliminates on the Mack pad, the pad is picked up and thrown away. The Mack invention does not contemplate that the animal will stand or sit on the pad after elimination. Therefore, while the Mack invention is practical in its intended application outside of carriers or cages, it is not suitable for use in carriers or cages.

There is a large body of invention in the field of disposable diapers and sanitary products. One example, now in the public domain, is U.S. Pat. No. 4,333,463 to Holtman for Absorbent Structure Containing Superabsorbent. The basic elements of this technology have been available for a considerable period, and have been applied to pet waste disposal sheets similar in concept to the Mack pad. Examples include U.S. Pat. No. 5,797,347 to Ochi for Absorbent Panel for Pet Animals, and U.S. Pat. No. 6,227,145 to Miyamoto & Ochi for Household Animal Waste Collection Sheet. Although the super-absorbent properties of these pads would make them better suited for use in carriers or cages than the Mack pad, they are not optimized for this application. For example, the Ochi and Miyamoto & Ochi sheets both have a bottom layer which is liquid impermeable. This feature, which protects to some degree the underlying surface, also prevents the sheet from absorbing waste which accidentally gets spilled on the underlying surface. Also, because the Ochi and Miyamoto & Ochi sheets are not meant for the animal to sit on for any extended period, they lack the cushioning and insulation of the present invention.

BRIEF SUMMARY OF THE INVENTION

The present invention overcomes problems in the prior art by: (1) providing a disposable article, thereby eliminating the need for cleaning; (2) utilizing available materials incorporating super-absorbent polymers or other super-absorbent material or structures to prevent absorbed urine being expressed from the cushion when the animal stands or sits on it; (3) utilizing a substantially rigid, cushioning, insulating element within a larger flexible absorbent cushion, rather than trying to find a single material which is at once rigid, absorbent and soft; and (4) combining a rigid central region with a flexible peripheral region, thereby allowing the product to fit a wider variety of carriers, and providing some side coverage. In its preferred embodiment, it is a seven layer cushion in its central region, consisting of (in order): top sheet (1); top absorbent layer (2); top cushion layer (3); insulating core (4); bottom cushion layer (5); bottom absorbent layer (6); and bottom sheet (7). In the peripheral region, the middle three layers—the top cushion layer (3), insulating core (4) and bottom cushion layer (5)—are omitted. The invention also includes a pull tab handle. The word "rigid" as used in this specification means deficient in or devoid of flexibility. "Flexibility" as used in this definition means the capacity to be flexed. "Flexed" as used in this definition means to be bent, especially repeatedly.

DETAILED DESCRIPTION OF THE INVENTION

Figure 1:
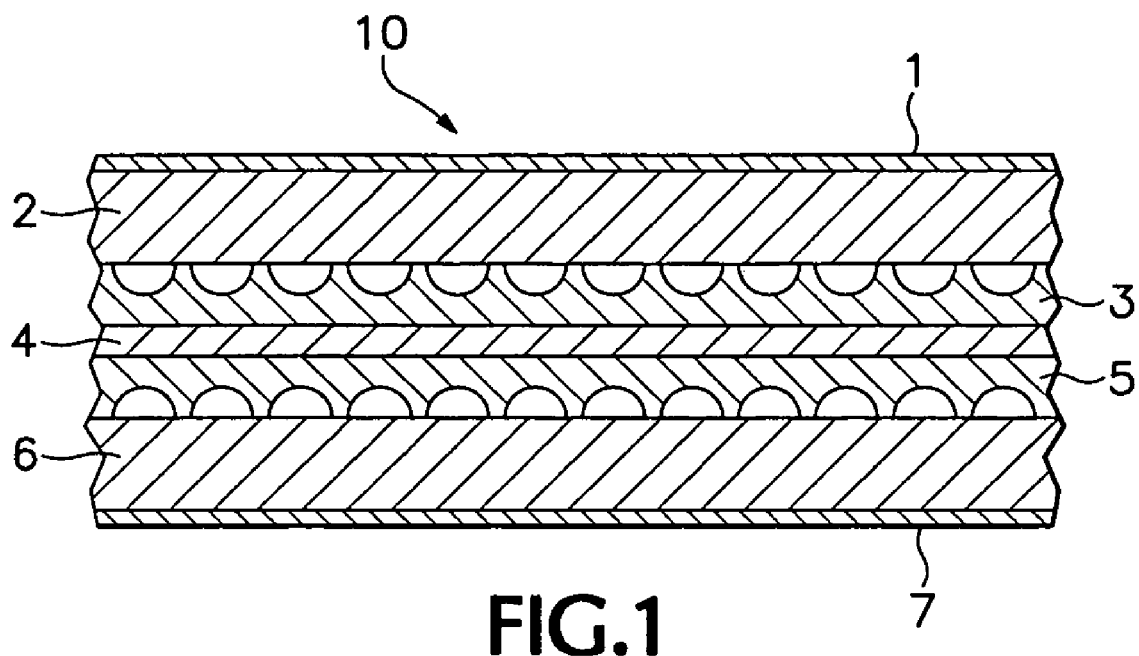
FIG. 1 is a cross-section of the cushion in its central region.

Referring to FIG. 1, in the central region the core of the cushion is an element which provides rigidity and thermal insulation, and at the same time some elasticity, so that it is comfortable for the animal to sit on. In the preferred embodiment, this core element comprises a 0.635 cm. (0.25 inch) sheet of corrugated cardboard (4) onto which is attached, top and bottom, sheets of cushioning material (3) and (5). Foamed polystyrene, or any other material which provides moderate rigidity and insulating properties, may be substituted for corrugated cardboard.

Suitable cushioning material (3) and (5) would be common polyethylene air cellular cushioning material, such as Bubble Wrap™, sold by Sealed Air Corporation of Saddle Brook, N.J. In the preferred embodiment, the cushion layers (3) and (5) are impervious to liquid, which will further trap and prevent the liquid within the top absorbent layer (2) from passing into the bottom absorbent layer (6). In the preferred embodiment, the air cellular cushioning material in the cushioning layers (3) and (5) would be a single layer having an actual air cell size of at least 0.3175 cm. (0.125 inch). The main function of the top and bottom cushion layers (3) and (5) is to add comfort and fill to the overall cushion. In addition to its cushioning effect, in its preferred embodiment the cushioning material will add some thermal insulating qualities to the cushion.

Outside of the core are two absorbent layers, top and bottom (2) and (6). These absorbent layers must contain at least some super-absorbent materials such as cross-linked sodium polyacrlyate, $CH_2-CH(CO_2Na)$, or structures so that when fluid is absorbed into the layer it cannot readily be expressed through moderate mechanical pressure, like the weight of the animal standing or sitting. Suitable super-absorbent material includes a cross-linked poly sodium acrylate, which can be purchased under the trademark Lysorb from Lysac Technologies, Inc., of Boucherville, Quebec Canada. Any liquid which comes into contact with the superabsorbent materials will be retained in a gel-like state which will prevent its penetrating the top and bottom sheet pores because the liquid has been incorporated into larger structures. The absorbent layers (2) and (6) may also contain some proportion of ordinary absorbent materials such as cotton, paper or wood pulp fluff. A suitable prefabricated combination of materials which may be used for the top and bottom absorbent layers (2) and (6) is sold by McAirlaid's GmbH in Steinfurt, Germany under the trademark SuperCore also known as Airlaid NonWoven.

The exterior of the cushion is formed by top and bottom sheets (1) and (7) of flexible, material which is readily liquid-permeable. In the preferred embodiment, these layers are a hydrophilic non-woven polypropylene material made with a spun bond process, which is pervious to liquid, soft, cloth-like and pliable. Suitable material includes Fiberweb™ product code 44MXPD090 sold by BBA Nonwovens Washougal, Inc., in Washougal, Wash. The cloth-like attributes of the exterior layers of the cushion (1) and (7) add to the overall comfort of the cushion.

Because the cushion provides for absorption from both sides, when the cushion is in place in a carrier, cage or crate, the cushion can absorb any urine excreted by the animal. In the preferred embodiment, the bottom liquid absorbent layer (6) has its main purpose to absorb liquid or urine that is excreted against the inside walls and eventually pools at the bottom of the carrier.

Figure 2:
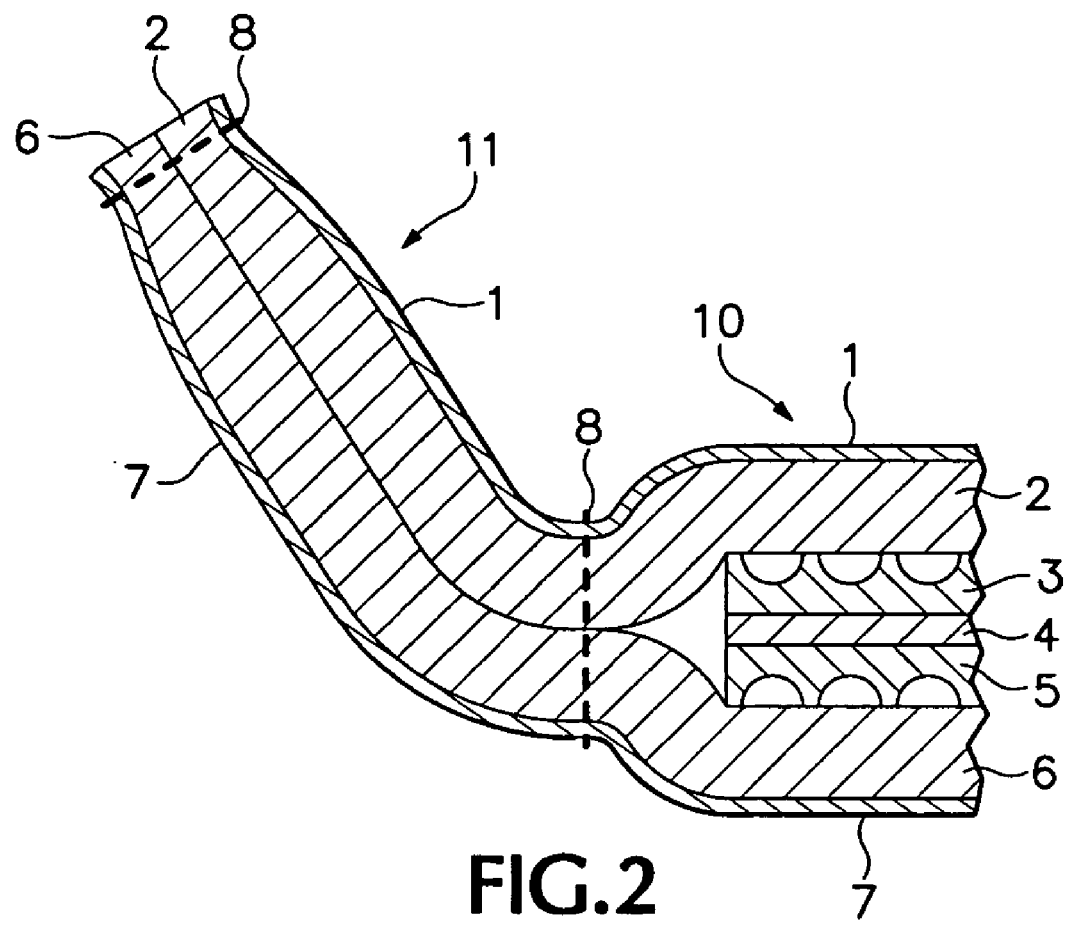
FIG. 2 is a cross-section of the cushion in its peripheral region.

Referring to FIG. 2, the cross-section of the peripheral region is the same as the cross-section of the central region, except that the rigid core element (3), (4) and (5) does not extend into the peripheral region. In the preferred embodiment, the layers of the rigid central element, (3), (4) and (5) are glued together. In the preferred embodiment, the top and bottom exterior layers (1), (2), (6) and (7) are held together with two lines of stitching (8), one line just beyond the outer edge of the rigid central region and one at the outer edge of the pad.

Figure 3:
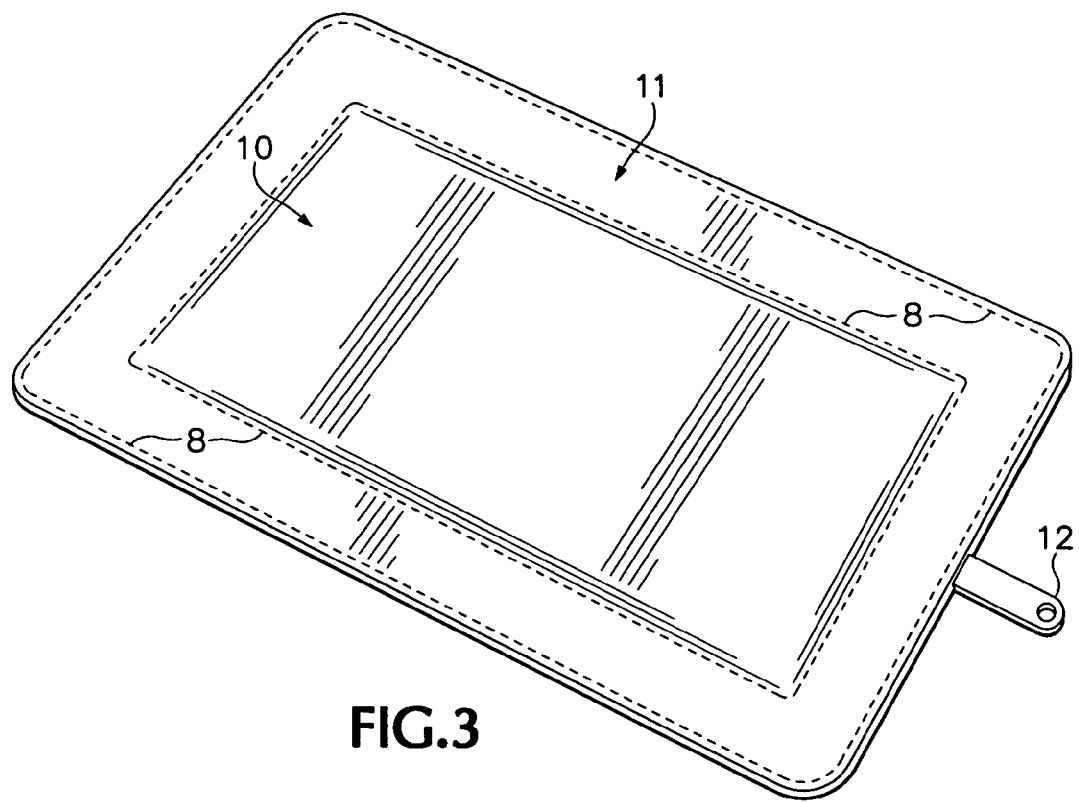
FIG. 3 is a perspective view of the cushion.

Referring to FIG. 3, the cushion has both a rigid central region (10) and a flexible peripheral region (11). In order to ensure that the cushion remains flat on the bottom of the carrier, the rigid central region (10) must extend through a substantial part of the cushion. In the preferred embodiment, the flexible peripheral region (11) would be approximately 5 cm (2 inches) wide. In order to fit in a particular carrier, the cushion must be sized so that none of the dimensions of the rigid central region (10) exceed the interior dimensions of the carrier, and none of the overall dimensions of the cushion are less than the interior dimensions of the carrier. This combination of a rigid central region (10) and a flexible peripheral region (11) allows one size of cushion to be used in multiple carrier types with slightly varying dimensions without sacrificing comfort or stability. The combination of a rigid central region (10) and a flexible peripheral region (11) also provides a nest-like effect, which provides additional comfort, thermal insulation, cushioning and liquid absorbance.

Referring to FIG. 3, in the preferred embodiment the entire cushion is held together by two rows of stitching (8)—one at the periphery of the cushion and one surrounding the rigid central region (10). Alternative embodiments include holding the cushion together by quilting, which might be accomplished by heat and pressure sufficient to deform and attach the layers after the fashion of spot welding, by stitching, by adhesives, by rivets, or by any other method. Regardless of the method used, care must be taken to ensure that the rigid element remains fixed in relation to the cushion overall. In the preferred embodiment, this is accomplished by the inner row of stitching (8).

The cushion is provided with a tab or handle (9), which allows the consumer to remove and dispose of a soiled cushion without handling the soiled cushion itself. When the cushion is arranged in the carrier, the tab (9) may be positioned to extend out the door of the carrier, which will minimize the chance of it becoming soiled.

We claim:
1. An absorbent disposable cushion for use by pets comprising:
   a. an exterior covering having a top and bottom made of a substantially liquid permeable material; and
   b. one or more layers located internally of said covering having an effective portion of super-absorbent material or structure for absorbing liquids while not readily expressing said liquids under moderate mechanical pressure; having:
   c. a rigid central region and
   a flexible peripheral region which is substantially less rigid-than the rigid central region; wherein
   d. the layers located internally of the covering having an effective portion of super-absorbent material extend through both the rigid central region and the flexible peripheral region.
2. The cushion of claim 1, further comprising a tab or handle.
3. A disposable absorbent cushion comprising:
   a. an exterior covering composed of a top and bottom made in effective part of liquid permeable hydrophilic non-woven material;
   b. a layer or layers located internally of said covering having an effective portion of super-absorbent polymers;
   c. a rigid central region defined by a substantially planar stiffening member and
   a flexible-peripheral region substantially less resistant to curling, rolling or rigid than the rigid central region, defined by the absence of stiffening; wherein
   d. said layers located internally of said covering extend through both the rigid central region and the flexible peripheral region.

* * * * *